Feb. 24, 1953 — R. L. STERNER — 2,629,472

FLUID SHEAR TYPE COUPLING

Filed Nov. 29, 1949

SLIP OF DRIVEN MEMBER IN
PERCENT OF FULL LOAD SPEED

INVENTOR.
RUSSELL L. STERNER,
BY
ATTORNEY.

Patented Feb. 24, 1953

2,629,472

UNITED STATES PATENT OFFICE 2,629,472

FLUID SHEAR TYPE COUPLING

Russell L. Sterner, Bell, Calif.

Application November 29, 1949, Serial No. 129,935

11 Claims. (Cl. 192—58)

This invention relates to a coupling for transmitting torque from a driving member to a driven member by means utilizing shear characteristics of a fluid.

Prior proposed fluid couplings, or fluid transmission means, have usually included a driven member operable in a chamber containing fluid wherein the driving member includes a plurality of vanes for imparting motion to the fluid, the moving fluid then impinging upon vanes on an opposed driven member for the purpose of imparting motion to the driven member. Such fluid transmission means are suitable under certain conditions for transmitting torque and usually include auxiliary means, such as pressure means, for obtaining a predetermined, selected, transmitted torque characteristic. Other proposed fluid couplings have included interleaved driving and driven elements wherein the axial position of the elements may be varied in order to obtain a desired transmitted torque.

An object of this invention is to design and provide a fluid coupling wherein torque transmitted from a driving shaft to a driven shaft is substantially uniform and constant.

Another object of this invention is to design and provide a fluid coupling wherein torque is transmitted from a driving member to a driven member by and through shear strain characteristics of the fluid employed in said coupling.

A further object of this invention is to design and provide a fluid coupling wherein centrifugal force acting upon the fluid is employed to compensate for variations in speed differentials between the driving and driven shafts in order to provide a virtually uniform and constant desirable transmission of torque. This invention contemplates a fluid coupling or torque transmitting device wherein a driving means and a driven means are provided with flat surfaces in face-to-face torque transmitting relationship and said driven means includes a chamber for holding fluid in non-torque transmitting relationship to said flat surfaces. The chamber communicates with the space between said flat surfaces by means forming an opening through the flat surface of the driven means, the opening being radially intermediate the flat surface of the driven member. The radial spacing of the opening provides for a radially outwardly directed space capable of being filled with fluid for transmitting torque over a constant torque transmitting selected area. The opening also provides a means for interflow of fluid from the chamber to torque transmitting areas lying radially inwardly of said openings whereby torque transmitted is automatically varied by the interflow of fluid through said opening when loading conditions on the device vary.

Generally speaking, the fluid coupling contemplated by this invention includes a driving shaft carrying a driving disk presenting flat surfaces on opposite sides thereof, and a housing carried by the driven member and journaled on the driving shaft and having an internal chamber. The housing includes an internal outer annular groove presenting flat faces in closely spaced relation to outer circumferential marginal surfaces of the driving disk and a pair of driven annular elements disposed on opposite sides of the disk and having flat faces lying in the same plane as the faces in the groove, the circumferential edge of the elements being radially spaced from the inner edges of the groove to provide annular openings affording communication with the chamber for passage of fluid between the chamber and the spaces between the driving disk and faces on the groove and elements, the fluid moving into said spaces by reason of the centrifugal force imparted to it by the driving disk.

Other objects and advantages of this invention will be readily apparent from the following description of the drawings.

Figure 1:
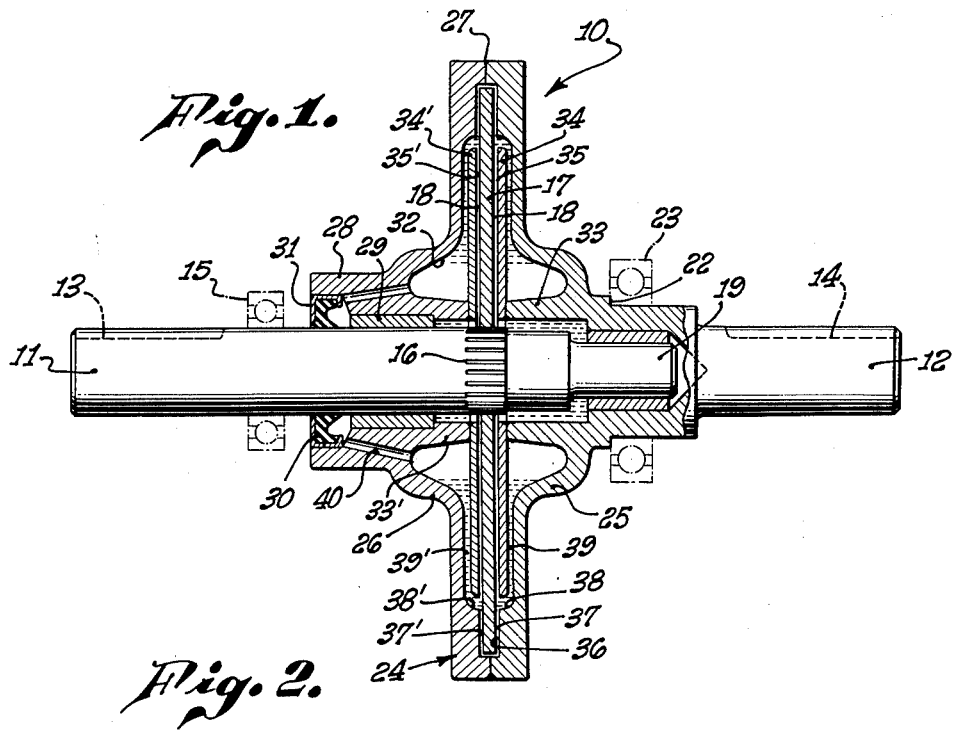
Fig. 1 is a sectional view of a coupling embodying this invention, the section being taken in a longitudinal plane passing through the axis of the coupling.

Referring to the drawings, the fluid coupling generally indicated at 10 comprises a driving shaft 11 and a driven shaft 12 axially aligned therewith. Each shaft 11 and 12 may be provided with a keyway 13 and 14, respectively, extending axially for providing a connection to a power driving means and a driven means to which it is desired to transmit torque. The driving shaft 11 may be rotatably mounted in a bearing 15 of suitable type, illustrated in diagrammatic lines as a ballbearing. Adjacent one end of shaft 11 is a splined portion 16 affording a fixed connection for an annular, flat, imperforate driving disk 17 having opposite flat, annular driving surfaces 18, said disk lying in a plane perpendicular to the driving shaft 11. Adjacent disk 17 the driving shaft 11 may be provided with a stepped portion 19 of reduced diameter rotatably mounted in a bearing 20 carried within a hub 21 formed on one end of the driven shaft 12.

Hub 21 may be provided with an external shoulder 22 defining a seat for an external bearing 23 of any suitable type, as a ballbearing shown in diagrammatic lines, for rotatably mounting the driven shaft 12. A hollow housing, generally indicated at 24, encloses the disk 17 and may include a radially extending annular, stepped, flanged portion 25 carried by hub 21 and shown as being integrally formed therewith and a corresponding, opposed, radially extending annular, stepped, flanged cover portion 26. The portions 25 and 26 may be sealably connected together along corresponding abutting circumferential margins, as by welding at 27, or by other convenient means such as a plurality of circumferentially spaced nut and bolt assemblies. The cover portion 26 includes a hub 28 rotatably mounted on the driving shaft by bearing 29. At its outer edge, the hub 28 is provided with an annular recess 30 for tightly accommodating a suitable seal ring 31 between the hub and the shaft 11.

The portions 25 and 26 comprising the housing are virtually symmetrical in form about and adjacent to the driving disk 17 and define an internal chamber 32 affording storage space for fluid which is non-torque transmitting during operation of the coupling. Since the portions 25 and 26 include substantially identical elements, like reference numerals will be employed to designate said elements, the elements of portion 26 being indicated by a prime sign.

The portions 25 and 26 are provided with opposed, axially extending inner flanges 33 and 33', respectively, encircling the adjacent end of the driving shaft on opposite sides of the driving disk 17. Secured to the annular edges of the flanges 33 and 33', as by welding, are a pair of annular driven members 34 and 34' disposed on opposite sides of the driving disk 17 and in closely spaced relationship.

The members 34 and 34' present flat, annular faces 35 and 35' lying in planes parallel to the planes of the surfaces 18 on the driving disk. The outer radius of said driven members is less than the radius of the driving disk, illustrated here by way of example, as being approximately three-fourths of the radius of the disk. It is understood, of course, that this proportion may be varied and changed, as desired.

Portions 25 and 26 define, at their outer circumferential margins, an internal, annular groove or recess 36 having walls presenting parallel, flat faces 37 and 37' lying in the same plane as the faces 35 and 35' of the driven members, said groove accommodating in closely spaced relation and for movement therein the outer circumferential marginal surfaces of the disk 17. The inner annular edges of the groove are spaced from the outer circumferential edges of the driven members 34 and 34' to provide annular openings 38 and 38' affording communication between the chamber 32 and the spaces between the driving surfaces on the disk and the driven faces on the members 34 and 34' and on the groove 36.

The internal chamber 32 includes a wide portion on each side of the driving disk defined by the axially extending inner flanges 33 and 33' and the stepped sections of the portions 25 and 26. A narrow, radially extending portion of the chamber 32 is defined by annular communicating spaces 39 and 39' provided between the wide portion of the chamber and the openings 38 and 38'.

Fluid means are introduced to the chamber 32 by passageways 40 formed in the hub 28 before the seal ring 31 is installed. Any predetermined quantity of fluid may be introduced into and confined within the chamber 32. When the coupling is inoperative, the fluid means preferably almost fills the lower half of the storage chamber and the spaces between the driving disc 17 and driven members 34 and 34' below the axis of rotation, the level of the fluid being slightly lower than the bottom edge of the drive shaft 11. The fluid means used in this coupling is preferably one having high resistance to heat in order to maintain a substantially constant viscosity over a wide range of temperatures, such a fluid means being, for example, a silicon oil.

Figure 2:
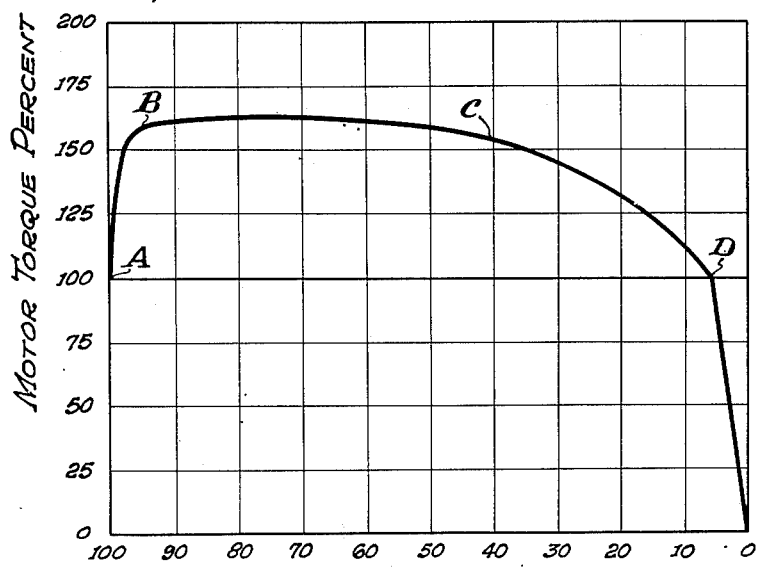
Fig. 2 is a graph illustrating the torque characteristics of the fluid coupling shown in Fig. 1.

Operation of the fluid coupling described above contemplates that the driving shaft of the coupling be suitably connected to a virtually uniform constant speed motor. The torque transmitted by the coupling is dependent upon the adherence of the fluid to said faces and said surfaces, and the shear strain of the fluid. The viscosity of the fluid and the spacing between the driving surfaces and driven faces are considered for purposes of explanation as being virtually constant. The torque characteristics of the coupling may be best explained by reference to the chart in Fig. 2 and by considering the driven shaft and housing initially restrained against rotation, a condition similar to that of a starting load on a driving member wherein inertia of a driven means to be rotated must be overcome.

When the driving and driven shafts are at rest, fluid occupies the lower half of the coupling, including the lower spaces between the driven faces 37, 37' and 35, 35' and the driving surfaces 18. As the driving shaft commences rotation, the torque effect of the fluid in the lower half of the chamber is to instantaneously and temporarily transmit a high percentage of torque (not indicated on the graph). This temporary, instantaneous high percentage of torque is immediately reduced when the fluid is expelled by centrifugal force imparted to it by rotation of the driving disk, the fluid flowing first into the groove for filling the spaces between the driving surfaces and the driven faces 37, 37'. When these spaces are filled, the remaining fluid flows through the annular openings 38, 38' into the storage chamber where that part of the fluid within the chamber is inoperative to transmit torque.

It will be readily apparent that the fluid impelled into the spaces between the groove and the outer circumferential margin of the driving disk is confined therein and exerts a torque force upon the driven housing and shaft. In the coupling shown the relationship of the effective areas of the opposed driving faces and driving surfaces in the groove is so arranged that virtually 100% motor torque is available when the slip is 100% of full load speed, a condition existing when the housing is fully restrained against rotation. The point is indicated on the graph at point A.

As the driven shaft and housing are allowed to rotate, the percentage of motor torque immediately available for transmission by the fluid through the driven housing is that indicated at point A which includes the fluid acting between the groove and the outer margins of the driving disk. As the driven housing begins to rotate, the centrifugal force imparted to the non-working fluid in the chamber by the housing causes some of this fluid to flow through the annular spaces 38, 38' and into the spaces between the driving disk and the driven faces 35, 35'. It is apparent that as the fluid flows into these spaces the effective incremental annular area immediately adjacent openings 38, 38' is relatively great for transmitting torque when an incremental depth of fluid is disposed therebetween. This causes the percentage of motor torque to increase in a rather steep, curved portion to a point B, indicating a condition of approximately 160% of motor torque and 95% of slip.

As the housing increases speed, additional non-working fluid is impelled through the openings 38 and 38', the fluid being forced radially inwardly between the driven faces 35, 35' and the driving surface 18. It will be readily apparent that as the fluid progresses radially inwardly the effective incremental annular area upon which the fluid acts decreases quite rapidly because the radius decreases, although it is understood that the total effective working or torque transmitting area has increased. As a result the percent of motor torque transmitted is virtually constant between the condition of 95% slip (point B) and that of 40% slip, indicated at point C.

As the slip decreases, that is as the driven member gradually approaches the speed of rotation of the driving member, the curve gradually decreases to point D, representing a condition where 100% motor torque is transmitted at 5% slip. At point D the torque transmitting fluid between the driving surfaces 18 and the driven faces 35, 35' is virtually balanced with the non-torque transmitting fluid remaining in the internal storage chamber, that is the levels of the fluids in said spaces and internal chamber are virtually equally radially distant from the axis of the shafts.

It will be readily apparent that any changes in the amount of slip caused by fluctuations of load on the driven member, or by changes in motor torque, will be immediately compensated for by the interchange of torque transmitting and non-torque transmitting fluid through the openings 38 and 38' to thus automatically vary the effective working area between the driving surfaces and the driven faces, said variations being governed by centrifugal force imparting flow to the fluid and created by the rotation of the driving shaft and driven housing. Thus, a fluid transmission coupling has been provided which is characterized by generally constant torque transmission over a wide range of variations in slip and wherein the centrifugal force acting upon the fluid provides a virtually constant and continuous torque transmission by means of the arrangement of the groove and the cooperating outer margins of the disk. It is important to note that the housing provides a storage chamber for fluid which is maintained or held in nonworking or non-torque transmitting relationship to the driven disc. When the coupling is rotated, fluid will flow into the spaces formed between the outer circumferential margin of the driving disc and the groove 36 for defining a selected torque transmitting area. The spaces between the driving disc and the annular members 34 and 34' provide a variable effective torque transmitting area adapted to be operable when the loading conditions on the coupling change, whereby fluid from the storage chamber may flow through the openings 38 and 38' and then radially inwardly into said spaces or vice versa.

It should also be noted that the responsiveness of the fluid coupling described above may be readily varied by employing a fluid of either lighter or heavier viscosity.

It should be readily apparent to those skilled in the art that while the embodiment of this invention has shown driven and driving faces arranged in parallel planes lying perpendicular to the axis of the coupling, it is also contemplated that concentric driven faces and driving faces may be provided in a suitable arrangement so as to obtain the desired torque characteristics. In this respect it should be noted that the bottom wall of the groove and the outer circumferential edge of the driving disk present opposed concentric surfaces between which the fluid acts to transmit torque.

Obviously, this invention contemplates that the relationship between the opposed areas of the driven members and the driving disk may be readily varied by changing the radius of the driven members and by varying the depth of the groove 36. While an annular opening 38 and 38' has been shown between the edges of the groove and the outer circumference of the driven members, it is contemplated that such annular opening may be varied and that the driven members may be provided with perforations or slots therein, in accordance with a preselected pattern in order to afford predetermined torque transmission characteristics.

While the coupling described above shows the provision of only one driving disk and driven members presenting radially outwardly spaced driven faces on opposite sides of said single disc, it is to be understood that this invention contemplates the provision of a plurality of driving disks and a plurality of driven members having radially spaced driven faces interleaved between the driving disks in order to provide a fluid coupling capable of handling predetermined loads.

All changes and modifications coming within the scope of the appended claims are embraced thereby.

I claim:

1. In a fluid coupling, the combination of: an axially aligned driving shaft and a driven shaft, each mounted for rotation with respect to each other; a hollow housing carried by the driven shaft and journaled on the driving shaft; said housing having an annular internal groove presenting parallel annular driven faces; annular driven members carried in spaced relation by said housing and defining a storage chamber for fluid held in non-torque transmitting relation, said driven members having flat driven faces lying in the same planes as the first mentioned faces, the outer edges of said driven members being radially spaced from the edges of said groove for defining annular openings; a driving disk fixed on the driving shaft and extending radially outwardly between the driven members and into the groove, said disk presenting flat driving surfaces in close, spaced relation to the driven faces on the members and the groove; and fluid means within the storage chamber and in communication with the annular openings for flow of fluid between the chamber and the spaces between the driven faces and driving surfaces when said driving shaft is rotated.

2. In a fluid coupling, the combination of: a driving shaft and driven shaft mounted for independent rotation; a hollow housing on the driven shaft and provided with an internal chamber for holding fluid partly in non-torque transmitting relation; a plurality of radially outwardly spaced driven faces carried by said housing; a driving member fixed to the driving shaft and provided with driving surfaces opposed to said driven faces and in closely spaced parallel relation thereto; sealing means for the chamber; and fluid means partially filling said storage chamber in non-torque transmitting relation and between said driving surfaces and driven faces in torque transmitting relation; means forming an opening for communication between said chamber and the spaced driving surfaces and driven faces, said fluid means being interflowable through said means forming said openings in response to variations of load on the driven member for varying the effective torque transmitting area between said driving surfaces and driven faces.

3. In a fluid coupling, the combination of: a driven means and a driving means therefor, said driven means including a chamber adapted to hold a quantity of torque transmitting fluid, a part of the fluid being held in non-torque transmitting relation to said driving means; a plurality of radially outwardly spaced annular driven faces lying in parallel planes; said driving means including a driving disc having driving surfaces opposed to and spaced from the driven faces; and means formed on said driven means providing an opening communicating with the chamber and the spaces between the driving surfaces and the driven faces for flow of fluid between the driving surfaces and driven faces.

4. In a fluid coupling, the combination of: a driven means and a driving means, said driven means including a chamber adapted to hold fluid partly in non-torque transmitting relation, an inner radially outwardly directed driven face, an outer radially outwardly directed driven face spaced from said inner driven face; an opening defined by the spacing of said inner and outer faces; said driving means including a driving member having a driving surface opposed to said inner and outer driven faces and in closely spaced relation thereto; said fluid means carried within the chamber being in fluid communication with said opening and being responsive to variation in load upon the driven means for flow between said driven and driving faces for varying the effective working area of said faces for transmitting torque therebetween.

5. A fluid coupling as defined in claim 4 wherein said chamber is relatively wide adjacent the axis of the driven means and is narrow in width adjacent said opening.

6. In an apparatus for transmitting torque between a driving means and a driven means by fluid, the provision of: a driving surface on said driving means; an outer radial face and an inner spaced radial face on said driven means, said faces being spaced from and lying in face-to-face relation to said driving surface; said driven means including a hollow housing for enclosing said driving surface and driven faces; means forming a chamber in said housing for holding part of the fluid in non-torque transmitting relation to said driving means; and means forming an opening between said outer and inner radial faces on said driven means for flow of fluid between said inner radial face and driving surface and in torque transmitting relation therewith, the flow of said fluid being responsive to differential speeds between the driving and driven means for automatically varying the effective torque transmitting area between the inner radial face and the driving surface.

7. A torque transmitting apparatus as recited in claim 6, wherein the opening is annular in form.

8. An apparatus as recited in claim 6, wherein the effective working area of the outer radial face and the opposed portion of the driving surface for transmission of torque includes a concentrically arranged face portion on said driven means and surface portion on said driving means.

9. An apparatus as recited in claim 6, wherein the chamber includes a narrow portion adjacent to the means forming the opening and a wide axially extending portion adjacent to the axis of rotation of said apparatus.

10. In an apparatus for transmitting torque between a driving means and a driven means by fluid, the provision of: a flat driving surface on said driving means; radially spaced driven faces on said driven means lying in the same plane and spaced from and opposed to said driving surface; said driven means including a hollow housing for enclosing said driving surface and said driven faces; means forming a chamber in said housing for holding fluid in non-torque transmitting relation to said driving means; and means forming an opening between said radially spaced driven faces for flow of fluid between said chamber and the spaces between said driven faces and driving surface into torque transmitting relation therewith, the flow of fluid being responsive to speed differentials between the driven means and the driving means for automatically varying the effective torque transmitting area of certain of the driven faces and the driving surface.

11. In a fluid coupling, the combination of: an axially aligned driving shaft and driven shaft; a hollow housing carried by the driven shaft and including an annular internal groove presenting parallel annular driven faces; means forming axially spaced storage chambers for fluid in said housing and including annular driven members carried in spaced relation by said housing and having flat driven faces lying in the same planes as the first-mentioned driven faces; a driving disc fixed to the driving shaft and extending radially outwardly between the driven faces of the driven members and groove, said disc presenting flat driving surfaces in close spaced relation to said driven faces; means forming an annular opening between the driven faces on each side of the driving disc, each opening providing flow of fluid between the associated storage chamber and the spaces between said driven faces and driving surface into torque transmitting relation therewith, the fluid remaining in said storage chambers being in non-torque transmitting relation to said driving surface; the flow of fluid between said storage chambers and the spaces between said driving surface and certain of said driven faces being responsive to variation in load imposed upon said driven shaft for varying the effective torque transmitting area between said driven members and said driving disc.

RUSSELL L. STERNER.

REFERENCES CITED

The following references are of record in the file of this patent:

UNITED STATES PATENTS

| Number | Name | Date |
|---|---|---|
| 630,299 | Moon | Aug. 1, 1899 |
| 923,565 | Newcomb | June 1, 1909 |
| 973,893 | Tichomiroff et al. | Oct. 25, 1910 |
| 1,183,530 | Brennan | May 16, 1916 |

FOREIGN PATENTS

| Number | Country | Date |
|---|---|---|
| 408,456 | Germany | Jan. 15, 1925 |
| 46,612 | Denmark | Oct. 13, 1931 |